(No Model.)

J. B. NOLIN & M. G. YOUNG.
SHINGLE AND PICKET SAWING MACHINE.

No. 446,534. Patented Feb. 17, 1891.

Witnesses:
Samuel D. Coulter
Anna M. Graeter

Inventor.
J. B. Nolin
M. G. Young
per Hiram Edwards Atty.

THE NORRIS PETERS CO., PHOTO-LITHO., WASHINGTON, D. C.

UNITED STATES PATENT OFFICE.

JOHN B. NOLIN AND MATTHEW G. YOUNG, OF NEW PITTSBURG, OHIO.

SHINGLE AND PICKET SAWING MACHINE.

SPECIFICATION forming part of Letters Patent No. 446,534, dated February 17, 1891.

Application filed August 26, 1889. Serial No. 322,031. (No model.)

*To all whom it may concern:*

Be it known that we, JOHN B. NOLIN and MATTHEW G. YOUNG, citizens of the United States, residing at New Pittsburg, in the county of Wayne and State of Ohio, have invented a new and useful Shingle and Picket Sawing Machine, of which the following is a specification.

Our invention relates to machines for sawing shingles and pickets; and it consists of improved mechanism, hereinafter fully described, whereby the shingle-block is better secured and fed; and it further consists of combining with the shingle-sawing device mechanism for preparing the shingle-blocks and sawing pickets.

Our invention is illustrated by the accompanying drawings, in which similar letters of reference indicate like parts.

Figure 1:
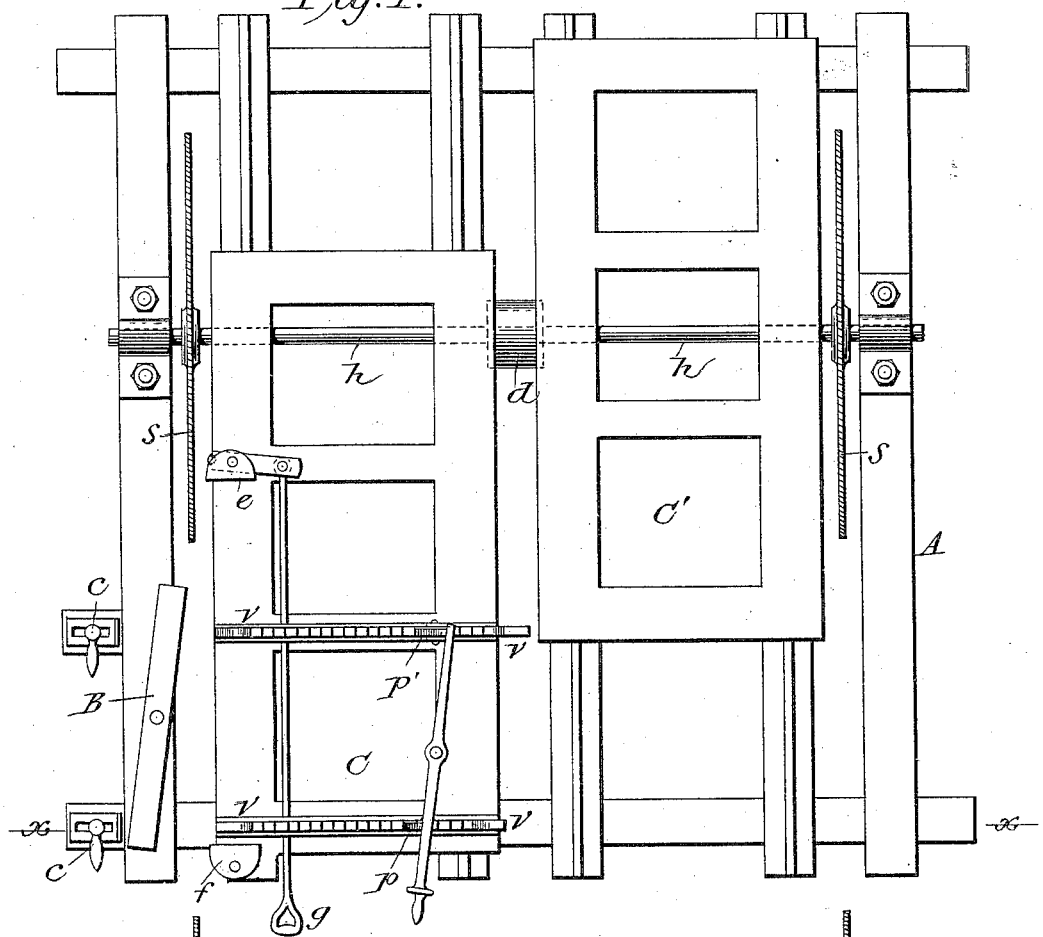
Figure 2:
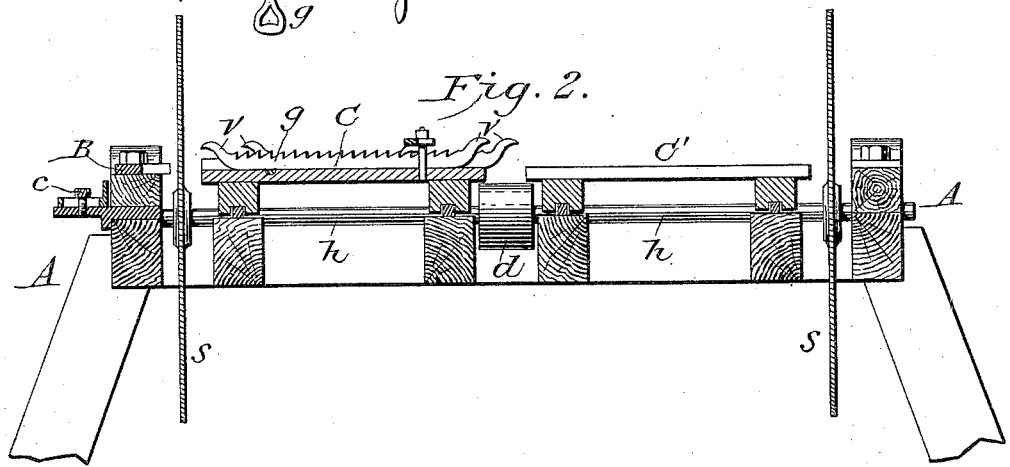

Referring to the drawings, Figure 1 is a top view of our invention. Fig. 2 is a vertical sectional view on the line X X.

A is a suitable frame, upon which is mounted the shaft $h$, carrying two circular saws $s\ s$. C C' are independently-movable carriages adjacent to each other and fitted to carry the timber to each saw, respectively.

$d$ is the belt-pulley. The carriage C is adapted to sawing shingles and the carriage C' to ripping shingle-blocks and sawing pickets. By this combination much time and labor are saved and much economy in the use of timber. The device for sawing shingles is shown in connection with the carriage C.

B is a pivoted gage-stop, such as heretofore used for a like purpose. Its swing is limited by end stops $c\ c$, which may be set to suit any desired bevel.

$e\ f$ are pivoted stops to secure the shingle-block upon the carriage while sawing. The stop $f$ is securely attached to the carriage by a pivot. The opposite end stop $e$ is secured by a pivot at the end of hand-lever $g$, whereby they are made to securely clamp the block. These stops are knife-shaped and lie on a plane with the carriage, the pivots admitting of the angular movement of the block, and the blades penetrating the ends of the block prevent rolling and admit readily the lateral movement necessary at each cut of the saw.

$v\ v$ are "dogs" having feed-dogs set in parallel grooves across the carriage, adapted to feed the shingle-block to the saw by an angular movement necessary to give the proper bevel to the shingle. The feed-dogs are provided with a series of ratchets along their upper surface, as shown. They are operated reciprocally or alternately by the hand-lever $b$, which is mounted upon the carriage by a pivot located centrally between the feed-dogs aforesaid, and provided with pawls $p\ p'$ to engage the ratchets, respectively. By this means the shingle-block is fed against the pivoted gage-stop B and reversed at each cut of the saw, the one hand-lever feeding it at a proper angle with the saw and the other firmly securing it, as aforesaid.

Having thus described our invention, what we claim is—

1. The combination, with the pivoted gage-stop B and carriage C, of the dogs $v$, the dogs provided with ratchets and operated alternately by means of pawls $p$ upon a common lever, substantially as shown.

2. The combination, with the pivoted gage-stop B and alternating feed-dogs $v$, of the pivoted end stops $e\ f$, substantially as shown, and for the purpose specified.

3. In a shingle and picket machine constructed as shown and described, the combination, with the two saws $s\ s$ upon a common shaft, of two carriages C C, located adjacent to the saws, respectively, and operated independently of each other, substantially as shown, and for the purpose specified.

JOHN B. NOLIN.
M. G. YOUNG.

Witnesses:
HIRAM B. SWARTZ,
W. S. TEYBURN.